United States Patent

[11] 3,609,445

| [72] | Inventor | Peter R. Williams |
| | | Wilton, Conn. |
| [21] | Appl. No. | 824,573 |
| [22] | Filed | May 14, 1969 |
| [45] | Patented | Sept. 28, 1971 |
| [73] | Assignee | United Aircraft Corporation |
| | | East Hartford, Conn. |

[54] ELECTRONIC IMAGE STABILIZATION SYSTEM
15 Claims, 4 Drawing Figs.
[52] U.S. Cl. .................................................. 315/21 R
[51] Int. Cl. ...................................................... H01j 29/76
[50] Field of Search ............................................. 315/21

[56] References Cited
UNITED STATES PATENTS

| 2,855,540 | 10/1958 | Hoover, Jr. et al. | 315/21 X |
| 2,904,721 | 9/1959 | Ault | 315/21 X |
| 2,913,622 | 11/1959 | Bartram et al. | 315/21 |
| 3,317,713 | 5/1967 | Wallace | 315/21 X |

*Primary Examiner*—Rodney D. Bennett, Jr.
*Assistant Examiner*—Brian L. Ribando
*Attorney*—Shenier & O'Connor ABSTRACT: A system for orienting the image presented on the face of a display tube in which time error signals indicating vertical, lateral and rotational displacements of the image, produced by comparing internally generated reference pulses with sense pulses generated as the electron beam passes over electrodes in the tube face, are then converted to analogue voltage error signals which are fed to the tube deflection system to restore the image to a predetermined orientation on the tube face.

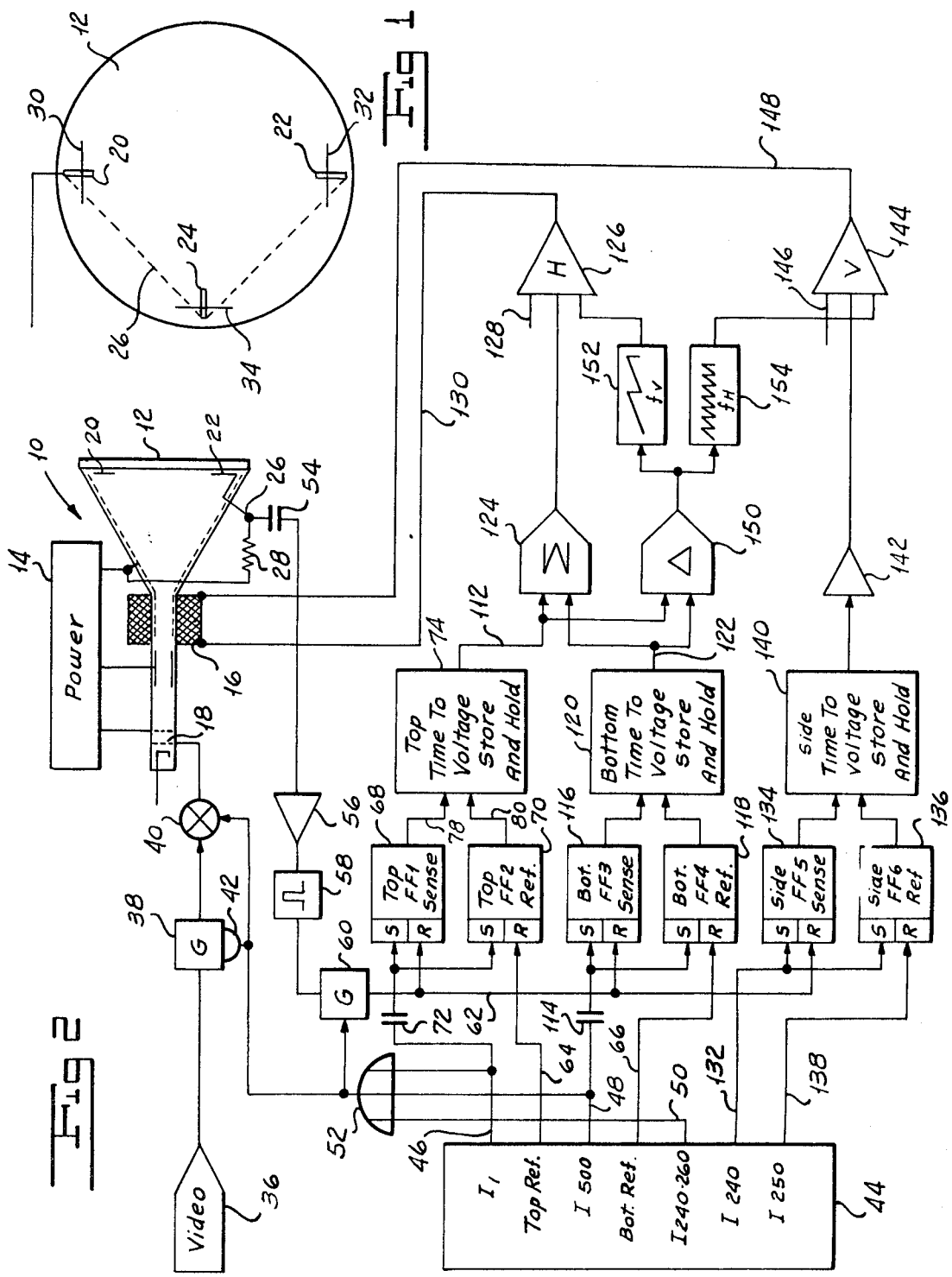

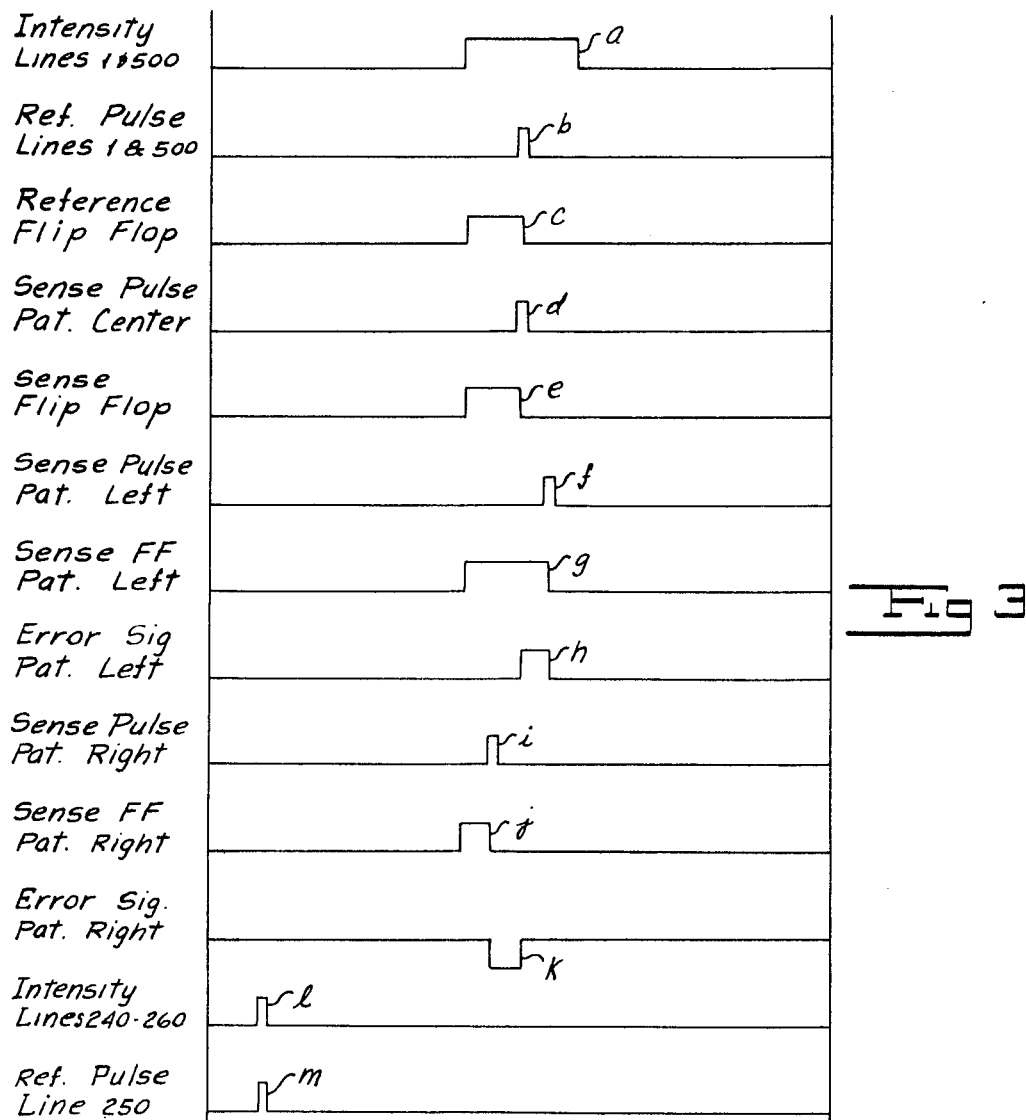
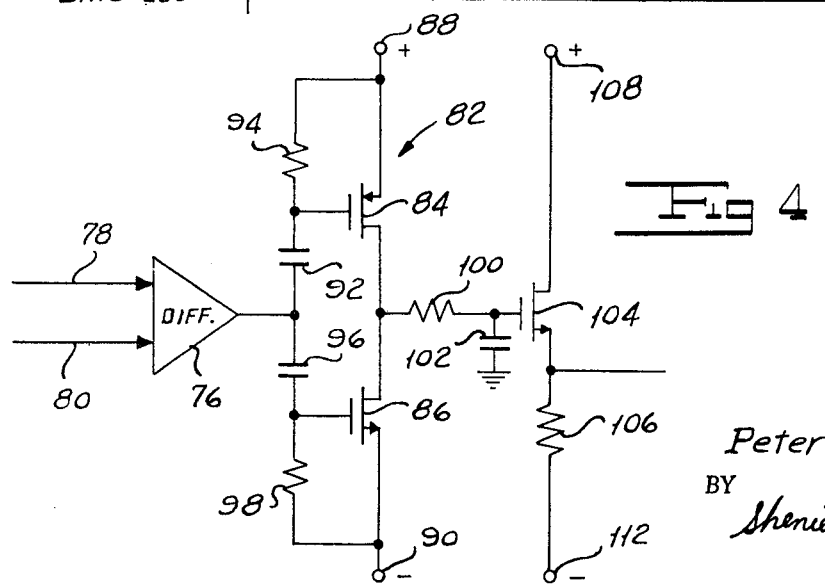

ELECTRONIC IMAGE STABILIZATION SYSTEM

BACKGROUND OF THE INVENTION

In the prior art the image display by a cathode ray tube must accurately be oriented with external indicia marked on the tube face. For example electronically generated range lines and the like must be properly oriented with respect to indicator marks on the tube face. Both internal defects and environmental influences may deleteriously affect the required registry. Internal defects can be accounted for by using precision low-drift deflection circuits and sweep circuits. Accurate circuit performance can be achieved by using high-gain operational amplifiers in a closed loop feedback circuit arrangement. In order to obtain positional accuracy it is necessary also to use high-precision electron guns.

While the expedients described above are effective to some extent in accurately positioning the image on the face of the cathode ray tube, they do not solve all of the problems involved in achieving this result. First, in many instances the devices are subject to local magnetic fields which produce displacements of the electron beam in direct proportion to field intensity. These external fields may cause distortion, rotation of the display or uniform displacements in the image. In attempting to obviate the influence of these external magnetic fields the cathode ray tube with the exception of the viewing area may be magnetically shielded. This expedient, however, is not practicable in all instances. For example, owing to optical considerations in a system such as the Head Up Collimated Viewing System disclosed in application Ser. No. 385,880 filed July 29, 1964, now U.S. Pat. No. 3,496,916 the cathode ray tube cannot be completely shielded.

Not only do systems such as that shown in the copending application referred to hereinabove not permit of effective magnetic shielding but also the electronic stabilization techniques described above are effective only up to the point of electron beam deflection and they cannot sense and correct for errors after deflection such as those which result from magnetic or electrostatic fields. Neither do they correct for errors resulting from electron gun misalignment.

I have invented an image stabilization system which overcomes the defects of stabilization systems of the prior art. My stabilization system maintains precise registry at all times between the tube image and mechanical indicia on the device. My system accounts for errors which otherwise would be introduced by magnetic field deflection, amplifier drift, electronic gun misalignment and the like. It corrects for both linear translation of the image and for rotation of the image. It corrects for errors which otherwise might be introduced after deflection of the electron beam.

SUMMARY OF THE INVENTION

One object of my invention is to provide an image stabilization system for regulating the orientation of a display tube image.

Another object of my invention is to provide an image stabilization system which accurately maintains registry of internally generated electronic symbols in the image with external reference marks on the display tube face.

A further object of my invention is to provide an image stabilization system which corrects for both linear translations and for rotation of the image.

A still further object of my invention is to provide an image stabilization system which compensates for errors which otherwise might be produced after deflection of the beam.

Other and further objects of my invention will appear from the following description:

In general my invention contemplates the provision of a system for maintaining a desired orientation of a display tube image in which internally generated electronic reference pulses are compared with sense pulses generated as the electron beam impinges on electrodes located at predetermined positions on the tube face to produce time error pulses indicating the vertical, lateral and rotational displacements of the image. These time error pulses are converted to analogue voltage error signals which are applied to the sweep circuitry to compensate for the errors indicated by the time error signals.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a plan view of the face of a display tube of my image stabilization system.

FIG. 2 is a schematic view of my image stabilization system.

FIG. 3 is a diagram illustrating various voltage pulses at different points in my image stabilization system.

FIG. 4 is a schematic view of a portion of the circuitry of my image stabilization system.

DESCRIPTION OF THE PREFERRED EMBODIMENT

Referring now to the drawings my image stabilization system includes a display tube indicated generally by the reference character 10 having a face 12, a power supply 14 connected to various elements of the tube in a conventional manner, a deflection coil 16 and an intensity control grid 18. The face 12 is provided with respective electrodes including a top electrode 20 a bottom electrode 22 and a side electrode 24, all of which are electrically isolated with respect to faceplate 12. The faceplate 12 may be an aluminized faceplate into which the isolated electrodes 20, 22 and 24 are etched. A conductor 26 electrically connects all of the electrodes and a resistor 28 connects these electrodes to the high voltage supply.

As will be explained more fully hereinafter I provide the image to be displayed on the faceplate 12 with respective bright line portions 30, 32 and 34 associated respectively with the electrodes 20, 22 and 24. The arrangement is such that when a point on one of the bright lines impinges on the associated electrode a sense pulse is produced on conductor 26. By way of example and for purposes of simplicity in exposition I arbitrarily select the bright portion 30 to be on line 1 of the display, the bright portion 32 to be on line 500 of the display and the bright vertical line portion 34 to extend from line 240 to line 260. I so provide the line portions 30, 32 and 34 that with the display correctly oriented lines 30, 32 and 34 are respectively centered on electrodes 20, 22 and 24. Bearing this in mind and assuming that the sweep of the electron beam is from left to right and from top to bottom in FIG. 1 it will be appreciated that with the display displaced to the left as viewed in FIG. 1 the sense pulses produced by lines 30 and 32 in cooperation with electrodes 20 and 22 will occur later in time than they would if the display were centered. Conversely, if the display is displaced to the right as viewed in FIG. 1 then the top and bottom sense pulses will occur earlier in time than they normally would. Analagously, if the display is above its normal position then the side sense pulse produced by line 34 in cooperation with electrode 24 will occur later in time than it normally would. If the display is translated downwardly then the side reference pulse will occur earlier in time than it normally would. It will readily be appreciated that the overall lengths of the respective line portions 30, 32 and 34 are determined by the range of possible or anticipated errors in the display.

The top and bottom sense pulses also afford a measure of any rotational error which might exist in the display. For example, if the image were rotated clockwise as viewed in FIG. 1 from its normal position, then the top sense pulse occurs later in time than it normally would and the bottom sense pulse occurs earlier in time than it normally would. Conversely, if the image is rotated in a counterclockwise direction as viewed in FIG. 1 from its normal position then the top sense pulse occurs earlier in time and the bottom sense pulse occurs later in time. As will be explained more fully hereinbelow I employ the top and bottom sense pulses to correct not only for lateral displacement of the image but also for rotational displacement thereof. It will further be appreciated that if desired I might arrange my system to compensate for rotational error by using two side electrodes rather than a single side electrode. In such case it would of course be necessary to provide only one vertical electrode, either a top electrode 20 or bottom electrode 22.

From the system thus far described it will be seen that the errors indicated by the sense pulses are all with reference to a normal position whereat the respective bright line portions 30, 32 and 34 are centered on their respective electrodes 20, 22 and 24. As will be described more fully hereinbelow. I provide respective reference pulses which are internally generated to indicate the times of occurrence of the centers of the bright line portions 30, 32 and 34.

The source 36 of video information to be displayed on the faceplate 12 is passed through a normally conductive gate 38 and a mixer 40 to the intensity control grid 18 of the display tube 10. Gate 38 includes an inhibiting terminal 42 to which signals may be applied to blank out the video signal as desired. I provide the bright line portions 30, 32 and 34 by increasing the signal applied to the intensity control grid 18 at times corresponding to the desired locations of the bright portions. Further in order to prevent the video information from providing undesired sense pulses I applied the same signals to the inhibiting terminal 42 to cut off the video information at times during which I wish to produce the bright line portions 30, 32 and 34.

A logic control circuit 44 provides the signals which are necessary for producing the bright line portions and for inhibiting the video. Respective channels 46 and 48 of the circuit 44 provide intensity signals at lines 1 and 500 having the general form of the wave form $a$ in FIG. 3. Similarly, channel 50 provides an intensity signal of the wave form 1 of FIG. 3 for each of lines 240 to 260 for example. A three-input OR-circuit 52 applies the signals on channels 46, 48 and 50 to the inhibiting terminal 42 of gate 38 to inhibit the video signal and to the mixer 40 which applies these signals to the intensity control grid 18 to produce the bright line portions 30, 32 and 34.

As has been explained hereinabove each time a bright line portion impinges on its associated electrode conductor 26 carries a sense pulse. A capacitor 54 couples all of these sense pulses to a sense pulse amplifier 56 which is essentially a low input impedance current amplifier which preserves the rise time of the current pulse. A Schmidt trigger circuit 58 receives the pulse from amplifier 56 and provides an output pulse which starts at an instant determined by the 50 percent peak level of the input current wave form. The output pulse therefore occurs at the instant the center of the cathode ray tube spot crosses the edge of the electrode. A gate 60 is adapted to couple the output pulses from trigger 58 to a common line 62. Preferably I render gate 60 conductive only during the periods of the bright line portions 30, 32 and 34. This is achieved by applying the output of the three-input OR circuit 52 to the control input terminal of gate 60.

As has been explained hereinabove, I provide an indication of lateral and rotational errors by comparing the top and bottom sense pulses with reference pulses which indicate the centers of the bright line portions 30 and 32. The logic circuitry 44 provides a top reference pulse at line 1 on a channel 64 having a wave form indicated at $b$ in FIG. 3. A similar wave form is provided by circuit 44 on a channel 66 at line 500 for example. Having a reference pulse indicating the time at which the bright line portion 30 should be crossing electrode 20 and having a sense pulse indicating the actual time at which the bright line portion 30 does cross electrode 20, I provide an error signal indicating the time difference between the two pulses and the direction of the error. Respective flip-flops 68 and 70 are adapted to be set in response to a first pulse applied thereto and then reset in response to the next pulse applied thereto. I set each of these flip-flops 68 and 70 at the same time before a top sense pulse can be expected to occur. I achieve this by coupling the line 1 intensity signal on channel 46 through a capacitor 72 to the set input terminal of flip-flop 68 and to the set input terminal of flip-flop 70. Thus both of the flip-flops 68 and 70 are set at the same instant in time. I apply the sense pulse on channel 62 to the reset input terminal of flip-flop 68. With the image centered the sense pulse will be as indicated at $d$ in FIG. 3. Thus if this flip-flop is set by the intensity signal corresponding to line 1 and is reset by the sense pulse $d$ it will produce a wave form indicated at $e$ in FIG. 3 which is a measure of the time between the beginning of the bright line portion 30 and the time at which the bright line crosses the electrode 20. I apply the top reference signal on channel 64 to the reset input terminal of flip-flop 70 so that this flip-flop produces a wave form or pulse indicated at $c$ in FIG. 3 having a length which is equal to precisely half the length of the line portion 30.

From the foregoing it will be appreciated that if the line portion 30 is precisely centered with respect to the electrode 20 then pulses $c$ and $e$ will be of exactly the same length.

If for example the image is to the left of center as viewed in FIG. 1 then the top sense pulse will occur later in time as indicated by the pulse $f$ in FIG. 3. As a result the top sense flip-flop 68 will not be turned off or reset until a later time as indicated by the wave form $g$ in FIG. 3. Conversely, if the upper portion of the image is to the right of center then the top sense pulse occurs earlier in time as indicated by pulse $i$ in FIG. 3 and the sense flip-flop 68 will be turned off sooner as indicated by pulse $j$ in FIG. 3. It will thus be seen that the difference, if any, in the length of the reference and sense flip-flop pulse is a measure of the error existing at the top of the pattern.

I provide a time-to-voltage, store-and-hold circuit 74 for providing a voltage having a magnitude which indicates the difference in length between the pulses of the reference and sense flip-flops and having a polarity which indicates the direction of the difference. Referring to FIG. 4 the circuit 74 includes a differential amplifier 76 having respective input channels 78 and 80 which receive the output pulses of the respective flip-flops 68 and 70. If the pattern is to the left the sense pulse appears later in time than does the reference pulse so that the flip-flop 68 is on for a longer period of time than is the flip-flop 70. Under these conditions the amplifier 76 produces a positive going output pulse having a duration equal to the difference in times the two flip-flops 68 and 70 were conducting. I have indicated such a pulse as $h$ in FIG. 3. Conversely, if the pattern is to the right then the sense pulse is earlier in time than is the reference pulse and flip-flop 68 conducts for a shorter period of time than does flip-flop 70. Under these conditions the amplifier 76 produces a negative going pulse having a duration which is equal to the difference in the periods of time for which the respective flip-flops conduct. I have indicated such a pulse by $k$ in FIG. 3.

I feed the output of amplifier 76 to a time-to-voltage conversion circuit indicated generally by the reference character 82. The circuit 82 includes respective P-channel and N-channel enhancement mode field effect transistors 84 and 86 connected in series between a terminal 88 at a positive potential and a terminal 90 at a negative potential. A capacitor 92 and resistor 94 apply to positive going output pulses from amplifier 76 to the gate of transistor 84. Similarly, a capacitor 96 and a resistor 98 couple negative going pulses to the gate of transistor 86. I further connect a resistor 100 and capacitor 102 between the common terminal of transistors 84 and 86 and ground. The circuit arrangement is such that with the pattern to the left so that the amplifier 76 produces a positive going time error pulse transistor 84 conducts to charge the storage capacitor 102 positively. Conversely, with the pattern to the right so that amplifier 76 produces a negative going output pulse transistor 86 conducts to tend to charge the capacitor negatively. It will be appreciated of course that where the pattern is precisely centered both flip-flops 68 and 70 conduct for the same period of time and the output of amplifier 76 is zero. I connect the capacitor 102 to a source follower amplifier stage including an N-channel field effect transistor 104 and a resistor 106 connected between positive terminal 108 and negative terminal 110. Incremental error voltages which appear on the capacitor 102 are held by virtue of the low leakage circuit to which the capacitor is connected. The analog error signal is therefore the integral of all previous incremental errors.

From the structure thus far described it will be apparent that the output channel 112 of circuit 74 carries a signal indicating the error at the top of the pattern resulting from a left-hand or right-hand displacement of the bright line portion 30 with reference to the electrode 20. A capacitor 114 couples channel 48 to the set input terminals of a pair of flip-flops 116 and 118 to set the flip-flops 116 and 118 at the beginning of the bright line portion 32 of line 500. Channel 62 provides a reset pulse for the bottom sense flip-flop 116 to turn that flip-flop off when line portion 32 actually crosses electrode 22. The channel 66 applies the bottom reference pulse at the center of the bright line portion 32 to the reset terminal of flip-flop 118 to turn that flip-flop off at the center of the bright line portion. I connect the two flip-flop outputs to another time-to-voltage, store-and-hold circuit 120 similar to circuit 74 so that, in the manner described above in connection with circuit 74, the output channel 122 of circuit 120 carries a signal indicating a left or right displacement of bright line portion 32 with reference to the electrode 22. With the signals available on channels 112 and 122 I correct for lateral displacement of the pattern by applying both these signals to a high gain summing amplifier 124 which provides an output proportional to one-half the sum of the signals on channels 112 and 122. The output of amplifier 124 is coupled to the horizontal sweep amplifier 126 which receives the usual horizontal sweep signal on a channel 128. A channel 130 carries the output of amplifier 126 to the deflection coil 16. In this manner, I compensate for any lateral displacement of the pattern from the desired central disposition thereof.

The timing logic circuit 44 provides a signal at line 240 on a channel 132 to set a third paid of flip-flops 134 and 136 associated with the side bright line portion 34. Thus analogously to the top and bottom sensing systems the flip-flops 134 and 136 for the side indication are set at a time prior to the time when one might expect a reference pulse to be produced. The channel 62 carrying the sensing pulses also is connected to the reset terminal of flip-flop 134 to reset that flip-flop at the time at which the line portion 34 coincides with the electrode 24. The timing logic circuit 44 produces a reference pulse at line 250 on a channel 138 to signal the center of the line portion 34. This signal resets flip-flop 136 so that the two flip-flops 134 and 136 respectively indicate the actual time at which the line portion 34 coincides with electrode 24 and the time at which it should coincide with electrode 24. From the foregoing it will be appreciated that a third time-to-voltage, store-and-hold circuit 140 similar to circuits 74 and 120 provides an output signal which is a measure of the vertical displacement of the image from its desired position. A high-gain amplifier 142 couples this signal to the vertical sweep amplifier 144 which receives the normal sweep signal on an input channel 146. A channel 148 couples the output of amplifier 144 to deflection coil 16.

Thus far I have shown how my system compensates for lateral and vertical linear translations of the pattern or image from its desired position on the faceplate 12. I also correct for any rotational displacement in the pattern by use of the top and bottom signals. From the foregoing discussion it will be apparent that if the image is rotated in a clockwise direction for example from the correct orientation then the top sense pulse occurs earlier in time than it should. The bottom sense pulse on the other hand will be later in time than it should be. Conversely, if the image has a counterclockwise rotary displacement the top sense pulse will be earlier in time than it should be and the bottom sense pulse will occur later in time than it should. I take advantage of this characteristic of my system to compensate for rotation of the display. I apply the top and bottom voltages on channels 112 and 124 to a high gain difference amplifier 150 to provide an output proportional to the rotation displacement of the top and bottom error voltages which will be a measure of rotation of the image. I apply this difference signal to respective modulators 152 and 154 which respectively tap off parts of the vertical and horizontal sweep signals proportional to the difference signal and respectively apply the tapped off portions to the horizontal and vertical sweep amplifiers. Thus the horizontal sweep signal is modified proportionally to the vertical sweep signal and the vertical sweep signal is modified proportionally to the horizontal sweep signal to compensate for rotation of the image.

The operation of my system in compensating for lateral and vertical linear translations of the image as well as rotational displacements of the image will be apparent from the description hereinabove. To summarize, should the image have a lateral linear translation to the right the top and bottom sense pulses occur too early in time and the circuit 74 as well as the circuit 120 produces a negative incremental signal which is applied to amplifier 124 which feeds the sweep amplifier 126. If the pattern has a linear translation to the left the sense pulses occur too late in time and a corresponding correction is made. Similarly if the image has a vertical upward displacement the side sense pulse occurs too late in time and a corresponding correction is made. If the pattern is too low then the side sense pulse occurs too early in time. Clockwise rotational displacement of the pattern results in a top pulse too early in time and a bottom sense pulse which is too late in time. Counterclockwise rotation of the pattern results in a top sense pulse too late in time and a bottom sense pulse too early in time. Corresponding corrections to the sweep signals are made in the manner described.

As I have pointed out hereinabove if desired I might provide a second side electrode and compensate for rotation by using the side sense signals. In such case only one top or bottom electrode would be required.

It will be seen that I have accomplished the objects of my invention. I have provided an image stabilization system which compensates for linear translations of the image and for rotational displacements thereof. My system ensures accurate registry between electronically generated marks and mechanical marks on the faceplate. It compensates for errors which might be introduced after deflection of the beam. It does not require shielding such as might interfere with the optical system with which the display device is employed.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A system for regulating the orientation of an image produced by an electron beam scanning the faceplate of a display device including in combination means for producing a first pulse at a predetermined time in the course of said scanning, means carried by said faceplate for producing a second pulse in response to the arrival of said beam at a predetermined location on said faceplate, means responsive to said pulses for producing a time error pulse representing the time difference between said pulses and means for converting said time error pulse to a voltage analog of said time difference and means responsive to said voltage analog for regulating the position of said image.

2. A system as in claim 1 in which said time error pulse has a length proportional to the time between the occurrence of said pulses and a polarity representing the order of occurrence of said pulses.

3. A system as in claim 1 in which said second signal-producing means comprises an electrode at said location and means for radically changing the intensity of said beam in the region about said electrode.

4. A system as in claim 1 in which the regulating means comprises means for varying the scanning speed of said beam.

5. A system for compensating for deviation from a predetermined orientation of an image produced by an electron beam scanning the faceplate of a display device with respect to orthogonal axes including in combination, a first electrode located at a predetermined position on said faceplate along one of said axes, a second electrode located at a second predetermined position on said faceplate along the other one of said axes, means for producing a first reference pulse at a time at which said beam should impinge on said first electrode, means including said first electrode for producing a first sense pulse when said beam does impinge on said first electrode, means responsive to said first reference pulse and to said first sense pulse for producing a first error signal representing the deviation of said image along said one axis, means for producing a second reference pulse at a time at which said beam should impinge on said electrode, means including said second electrode for producing a second sense pulse when said beam does impinge on said second electrode, means responsive to said second reference pulse and said second sense pulse for producing a second error signal representing the deviation of said image along the other axis, and means responsive to said error signals for regulating the orientation of said image, said means for producing said error signals each comprising means responsive to the corresponding sense and reference pulses for producing a time error pulse having a length equal to the time interval between the corresponding sense and error pulses and having a polarity indicating the order of the corresponding sense and error pulses.

6. A system as in claim 5 in which each of said electrodes is elongated in a direction perpendicular to the axis with which it is associated.

7. A system as in claim 5 in which said first and second electrodes are elongated respectively in a horizontal direction and in a vertical direction, said sense-signal-providing means comprising means for causing said beam to produce a high-intensity vertical line portion centered on said horizontal electrode and a high-intensity horizontal line portion centered on said vertical electrode in the normal orientation of said image on said faceplate.

8. A system as in claim 5 in which said error-signal-producing means comprises means for converting said time error pulse to an analogue voltage error signal.

9. A system for compensating for deviation from a predetermined orientation of an image produced by an electron beam scanning the faceplate of an display device with respect to orthogonal axes including in combination, a first electrode located at a predetermined position on said faceplate along one of said axes, a second electrode located at a second predetermined position on said faceplate along the other one of said axes, means for producing a first reference signal at a time at which said beam should impinge on said first electrode, means including said first electrode for producing a first sense signal when said beam does impinge on said first electrode, means responsive to said first reference signal and to said first sense signal for producing a first error signal representing the deviation of said image along said one axis, means for producing a second reference signal at a time at which said beam should impinge on said second electrode, means including said second electrode for producing a second sense signal when said beam does impinge on said second electrode, means responsive to said second reference signal and said second sense signal for producing a second error signal representing the deviation of said image along the other axis, a third electrode located at a third position on said faceplate along said other axis, means for producing a third reference signal at a time at which said electron beam should impinge on said third electrode, means including said third electrode for producing a third sense signal when said electron beam does impinge on said third electrode and means responsive to said third reference signal and to said third sense signal for producing a third error signal, and means responsive to said error signals for regulating the orientation of said image, said means responsive to said error signals comprising means responsive to the second and third error signals for compensating for rotation of said image.

10. A system as in claim 9 in which said second electrode is located adjacent the top of said faceplate and in which said third electrode is located adjacent the bottom of said faceplate.

11. A system as in claim 9 in which said first electrode is located generally centrally in a vertical direction adjacent one side of said faceplate and in which said second and third electrode are located generally centrally in a horizontal direction respectively adjacent the top and adjacent the bottom of said faceplate.

12. A system as in claim 9 in which said one axis is a vertical axis and said other axis is a horizontal axis, said means responsive to said error signals comprising means responsive to said first error signal for compensating for vertical displacement of said pattern, means responsive to one of said second and third error signals for compensating for lateral displacement of said image and means responsive to second and third error signals for compensating for rotational displacement of said pattern.

13. A system as in claim 12 in which said means for compensating for vertical displacement comprises means for offsetting the vertical position of said electron beam proportionally to said first error signal in which said means for compensating for lateral displacement comprises means for offsetting the lateral position of said electron beam proportionally to one of said second and third error signals and in which said means for compensating for rotational displacement comprises means for varying the horizontal sweep of said electron beam proportionally to the difference between said second and third error signals at the vertical sweep rate and means for varying the vertical sweep of said electron beam proportionally to the difference between the second and third error signals at the horizontal sweep rate.

14. A system for regulating the orientation of an image produced by an electron beam scanning the faceplate of a display device having a deflection system with respect to orthogonal axes including in combination, a side electrode elongated in a horizontal direction located on said faceplate, respective top and bottom electrodes elongated in a vertical direction carried by said faceplate, means for varying the intensity of said beam to produce respective bright line portions in said image intersecting said electrodes, said bright line portions being centered on said electrodes in the desired orientation of said image, means for producing respective top and bottom and side reference pulses at the centers of said bright line portions, means including said electrodes for producing respective top and bottom and side sense pulses as the bright line portions impinge on the corresponding electrodes, means responsive to the top reference pulse and the top sense pulse for producing a first error signal representing the lateral deviation from normal of the top of said image, means responsive to the bottom reference pulse and to the bottom sense pulse for producing a second error signal representing the lateral deviation from normal of the bottom of said image, means responsive to the said reference pulse and to the said sense pulse for producing a third error signal representing the vertical deviation from normal of the image, means responsive to one of said first and second signals for compensating for lateral displacement of said image, means responsive to said first and second signals for compensating for rotational displacement of said image, and means responsive to said third signal for compensating for vertical displacement of said image.

15. A system as in claim 14 in which said means for compensating for lateral displacement of said image comprises means for offsetting the lateral position of said beam proportionally to the sum of said first and second signals, said means for compensating for vertical displacement of said image comprising means for offsetting the vertical position of said beam proportional to said third signal, said means for compensating for rotational displacement of said image comprising means for modifying the horizontal sweep of said beam proportional to the difference between said first and second signals at the frequency of the vertical sweep of said beam and means for modifying the vertical sweep of said beam proportional to the difference between the first and second signals at the frequency of the horizontal sweep of said beam.

PO-1050
(5/69)

UNITED STATES PATENT OFFICE
CERTIFICATE OF CORRECTION

Patent No. 3,609,445      Dated September 28, 1971

Inventor(s) Peter R. Williams

It is certified that error appears in the above-identified patent and that said Letters Patent are hereby corrected as shown below:

Column 7, line 48:
"an" should be --a--.

Column 8, line 61:
"said" (both occurrences) should be --side--.

Signed and sealed this 7th day of March 1972.

(SEAL)
Attest:

EDWARD M. FLETCHER, JR.
Attesting Officer

ROBERT GOTTSCHALK
Commissioner of Patents